No. 746,665. PATENTED DEC. 15, 1903.
A. C. BOURDEAU.
MEANS FOR FEEDING OVENS.
APPLICATION FILED MAR. 18, 1902.
NO MODEL.
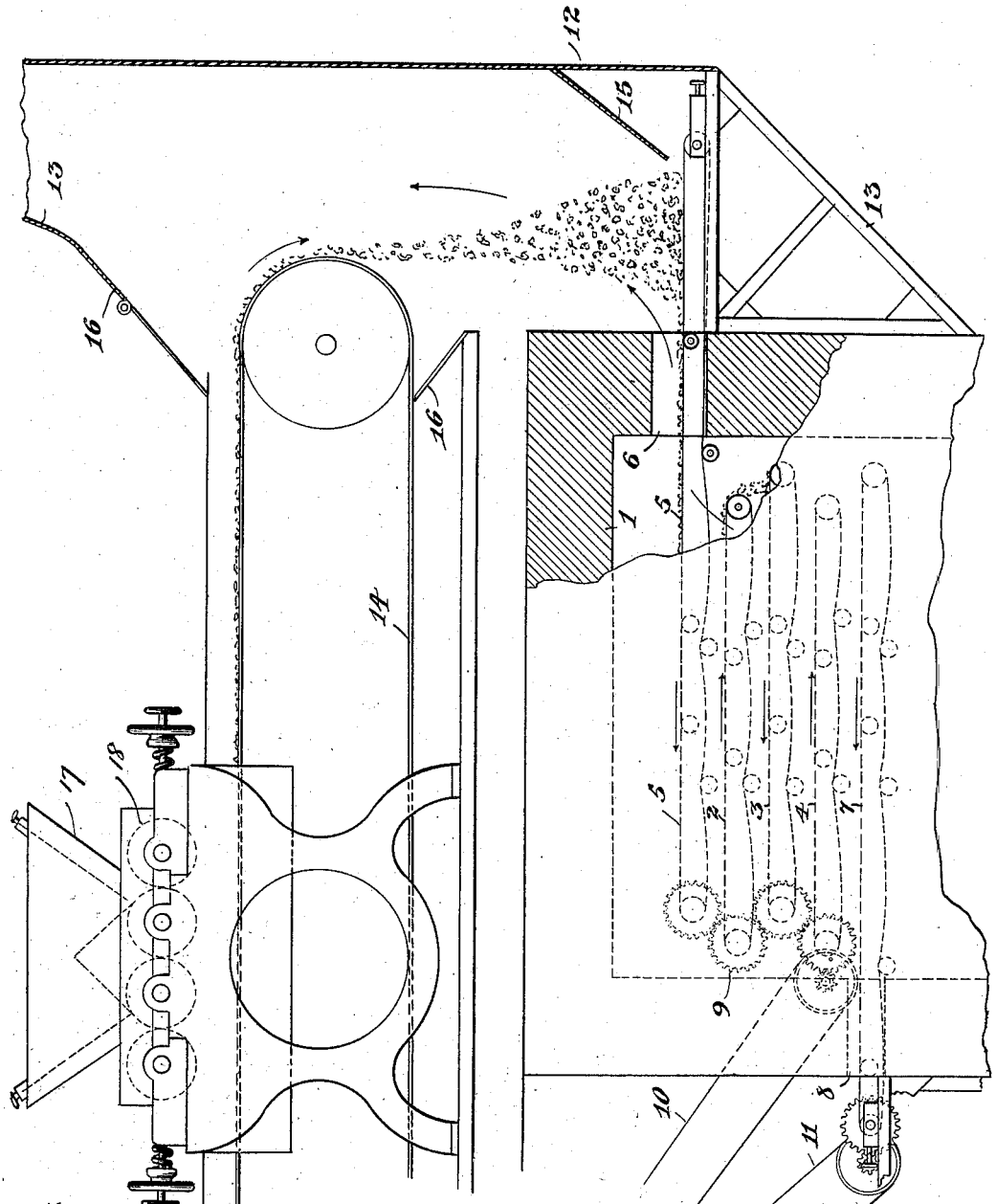

No. 746,665. Patented December 15, 1903.

UNITED STATES PATENT OFFICE.

ARTHUR C. BOURDEAU, OF BATTLECREEK, MICHIGAN, ASSIGNOR TO MALTA VITA PURE FOOD COMPANY, OF JERSEY CITY, NEW JERSEY, A CORPORATION OF NEW JERSEY.

MEANS FOR FEEDING OVENS.

SPECIFICATION forming part of Letters Patent No. 746,665, dated December 15, 1903.

Application filed March 18, 1902. Serial No. 98,746. (No model.)

*To all whom it may concern:*

Be it known that I, ARTHUR C. BOURDEAU, a citizen of the United States, residing at Battlecreek, in the county of Calhoun and State of Michigan, have invented certain new and useful Improvements in Means for Feeding Ovens, of which the following is a full, clear, and exact specification.

My invention relates more particularly to means for continuously feeding an oven with grain or cereal or other like finely-divided substance to be toasted or baked; and it has for its primary object to provide means for this purpose that will sprinkle the material evenly and lightly upon the supporting surface or surfaces which hold it in the oven during the toasting operation, thereby exposing the individual particles to a uniform degree of heat and avoiding underbaking of some and overbaking of others.

With these ends in view my invention consists in certain features of novelty in the construction, combination, and arrangement of parts by which the said objects and certain other objects hereinafter appearing are attained, all as fully described with reference to the accompanying drawing and more particularly pointed out in the claims.

The said drawing is a diagrammatic illustration of my improved apparatus.

1 is the oven-chamber, which may be constructed and heated in any suitable manner and which is provided within with any suitable device or devices for supporting the material to be baked or toasted. As an example of such means I have shown a number of endless aprons or conveyers 2 3 4, which may be composed of any suitable non-destructible material and supported within the oven-chamber in any appropriate way, such conveyers or aprons constituting no part of my present invention, as the same form the subject-matter of the claims in a copending application. The grain or cereal is deposited upon these aprons or conveyers by a similar apron or conveyer 5, arranged horizontally over the top one 2 and extending through a lateral passage 6 in one of the end walls of the oven, near the top thereof, and the material is received from the conveyers or aprons 2 3 4 by a conveyer or apron 7, arranged below the lowest one and extending through a lateral passage 8 in the opposite end wall of the oven near the bottom. All of these conveyers or aprons are driven alternately in opposite directions, and they alternately project beyond each other at opposite ends, so that the material on one will be deposited on the next one below, and so on down until the last one, 7, is reached, which will conduct the material through the end wall of the furnace and cast it off into any suitable chute or receptacle. (Not shown.) The conveyers 2 3 4 5 may be thus driven by a train of gears 9, deriving motion by belt 10 from any suitable source of power, and the apron or conveyer 7 may be driven in the proper direction by belt 11. The outer end of the upper conveyer 5 where it protrudes from the oven-wall is housed in by a suitable casing 12, supported on the frame 13 or by other means, and continues upwardly to an uptake or discharge flue 13, and discharging into the upper part of this casing 12 is an endless apron or conveyer 14, which receives the grain or material from the apparatus in which it is treated preparatory to being toasted and conducts it to this casing 12, where it allows it to fall in a shower upon the protruding end of apron 5, and as it descends in the casing it meets the upward rush of hot air rising in the oven-chamber through the passage 6, and is thereby considerably agitated while descending and caused to fall in a light shower upon the conveyer 5, any adhering particles being more or less separated in the descent, and as the apron 5 continuously travels inwardly through the passage 6 it carries the material in a feathery or light condition on its upper fold into the oven-chamber and deposits the same upon the next apron below, which in turn carries it in the reverse direction and deposits it on the next, and so on until the material has traversed all of the aprons and is conducted from the oven by the apron 7. 15 is a shield which may be arranged at the outer end of apron 5 to prevent the material escaping the latter in its descent. The side of the uptake 13 at the lower end thereof is provided with a lateral extension 16 partially inclosing the discharge end of the apron 14, so as to catch the ascending current of air, which carries more or less steam or vapor rising from the drying material, and causes the same to pass off through the uptake.

Primarily this apparatus is designed for feeding ovens with flaked grain or cereal, and when thus used the flaking-machine, one or more of which may be employed, is arranged over the upper fold of the conveyer 14 and may consist of any suitable device capable of mashing or flaking the kernels of grain. In the example shown in the drawing this device consists of a hopper 17 and one or more pairs of crushing-rolls 18, which receive the material from the hopper and deposit it in a flaked condition on the conveyer 14, which, like the conveyers in the oven-chamber, is driven continuously.

Having thus described my invention, what I claim as new therein, and desire to secure by Letters Patent, is—

1. In an apparatus for the purpose described the combination of an oven-chamber having a passage in the side thereof, an endless apron or conveyer extending through said passage, a casing inclosing the protruding end of said conveyer or apron and having an uptake, and means arranged in the upper part of said casing for sprinkling material to be baked upon said protruding end of the apron or conveyer, substantially as set forth.

2. In an apparatus for the purpose described the combination of an oven-chamber having a passage in the side thereof, an endless apron or conveyer extending through said passage, a casing inclosing the protruding end of said apron or conveyer, a second conveyer arranged exteriorly of the oven and having its discharge end located in said casing and adapted to discharge upon the protruding end of said first conveyer, and means for flaking grain or cereal arranged over said second conveyer, substantially as set forth.

3. In an apparatus for the purpose described the combination of an oven-chamber having an opening in its side near its top, means within said oven-chamber for supporting the material to be baked, comprising a conveyer extending laterally through said opening and projecting beyond the outer side of the oven-chamber, a casing inclosing said opening, an uptake extending upwardly from said casing, a second conveyer arranged exteriorly of the oven-chamber and having one end located within the casing over said projecting end of the first said conveyer and means over said second conveyer for flaking grain.

ARTHUR C. BOURDEAU.

Witnesses:
WM. F. NEALE,
GEO. F. NEALE.